(12) United States Patent
Bye

(10) Patent No.: US 11,007,766 B2
(45) Date of Patent: *May 18, 2021

(54) BONDED TAB AND TOOLING DEVICE

(71) Applicant: The Boeing Company, Chicago, IL (US)

(72) Inventor: Steven D. Bye, Renton, WA (US)

(73) Assignee: The Boeing Company, Chicago, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/508,585

(22) Filed: Jul. 11, 2019

(65) Prior Publication Data

US 2019/0337280 A1 Nov. 7, 2019

Related U.S. Application Data

(62) Division of application No. 15/417,023, filed on Jan. 26, 2017, now Pat. No. 10,377,122, which is a
(Continued)

(51) Int. Cl.
*B32B 38/18* (2006.01)
*B32B 37/02* (2006.01)
(Continued)

(52) U.S. Cl.
CPC .......... *B32B 38/1808* (2013.01); *B29C 33/30* (2013.01); *B29C 70/44* (2013.01);
(Continued)

(58) Field of Classification Search
CPC ........... B32B 38/1808; B32B 38/1833; B32B 38/1841; B32B 37/02; B32B 2327/12; B29C 33/30; B29C 70/46; B29C 70/86; B29C 70/44; B29C 65/7805; B29C 65/7808; B29C 65/7811; B29C 65/7844; Y10T 156/1089

See application file for complete search history.

(56) References Cited

U.S. PATENT DOCUMENTS 4,598,453 A 7/1986 Wills
5,123,304 A 6/1992 Carmien
(Continued)

FOREIGN PATENT DOCUMENTS

CN 1101751 C 2/2003
CN 101277809 A 10/2008
(Continued)

OTHER PUBLICATIONS

Extended European Search Report, dated Jun. 5, 2015, regarding Application No. EP14198366.8, 5 pages.
(Continued)

*Primary Examiner* — John L Goff, II
(74) *Attorney, Agent, or Firm* — Yee & Associates, P.C.

(57) ABSTRACT

A method and apparatus for forming a composite part. An apparatus comprises a tooling plate, a tab co-bonded with the tooling plate, and a group of alignment features associated with the tab. The tooling plate is configured for use with a tool to form a composite part. The group of alignment features is configured to position the tooling plate with respect to the tool used to form the composite part.

20 Claims, 13 Drawing Sheets

Related U.S. Application Data division of application No. 14/172,223, filed on Feb. 4, 2014, now Pat. No. 9,579,875.

(51) Int. Cl.

| | | |
|---|---|---|
| *B29C 70/46* | (2006.01) | |
| *B29C 70/86* | (2006.01) | |
| *B29C 33/30* | (2006.01) | |
| *B29C 70/44* | (2006.01) | |

(52) U.S. Cl.
CPC .............. *B29C 70/46* (2013.01); *B29C 70/86* (2013.01); *B32B 37/02* (2013.01); *B32B 2327/12* (2013.01); *Y02T 50/40* (2013.01); *Y10T 156/1089* (2015.01)

(56) References Cited

U.S. PATENT DOCUMENTS

| | | | | |
|---|---|---|---|---|
| 5,876,540 | A | 3/1999 | Pannell | |
| 6,698,484 | B1 | 3/2004 | Corbett et al. | |
| 7,624,491 | B2 | 12/2009 | Polus | |
| 8,632,653 | B2 | 1/2014 | Brown et al. | |
| 10,377,122 | B2 * | 8/2019 | Bye | B32B 37/02 |
| 2012/0204741 | A1 | 8/2012 | Bremmer et al. | |
| 2015/0352827 | A1 | 12/2015 | Bye | |
| 2017/0129193 | A1 | 5/2017 | Bye | |

FOREIGN PATENT DOCUMENTS

| | | |
|---|---|---|
| CN | 202986112 U | 6/2013 |
| EP | 1238784 A1 | 9/2002 |
| GB | 1048686 A | 11/1966 |

OTHER PUBLICATIONS

The State Intellectual Property Office of the People's Republic of China Notification of the First Office Action and English translation, dated Mar. 22, 2018, regarding Application No. 2015100585556, 15 pages.
Japanese Patent Office Notification of Reasons for Rejection with English Translation, dated Oct. 30, 2018, regarding Application No. 20150009194, 5 pages.
Office Action, dated Jan. 21, 2016, regarding U.S. Appl. No. 14/172,223, 17 pages.
Final Office Action, dated Jul. 15, 2016, regarding U.S. Appl. No. 14/172,223, 23 pages.
Notice of Allowance, dated Oct. 7, 2016, regarding U.S. Appl. No. 14/172,223, 9 pages.
Office Action, dated Aug. 31, 2018, regarding U.S. Appl. No. 15/417,023, 21 pages.
Final Office Action, dated Jan. 14, 2019, regarding U.S. Appl. No. 15/417,023, 11 pages.
Notice of Allowance, dated Mar. 27, 2019, regarding U.S. Appl. No. 15/417,023, 13 pages.

\* cited by examiner

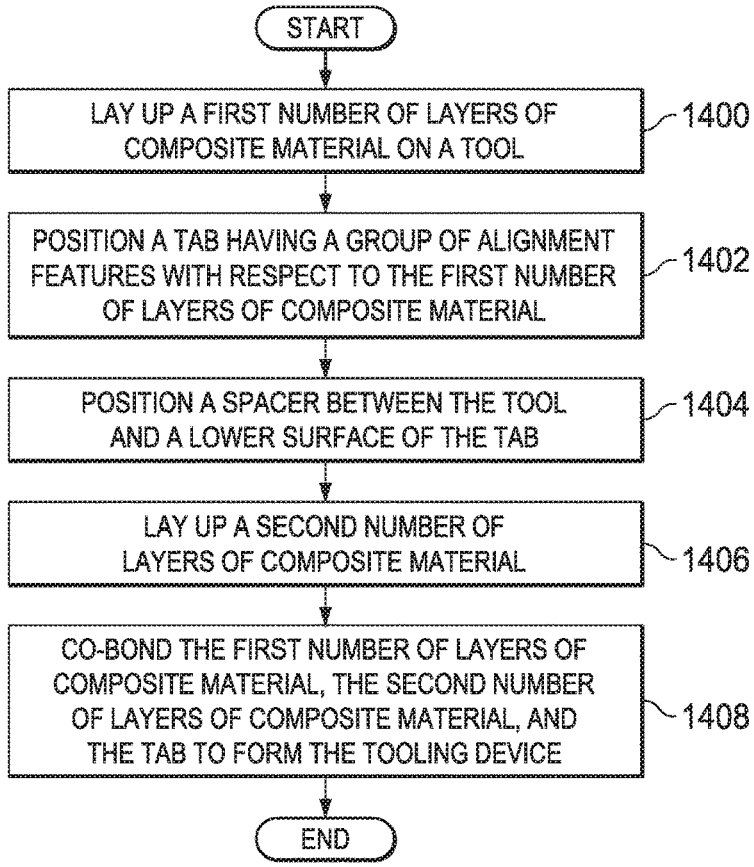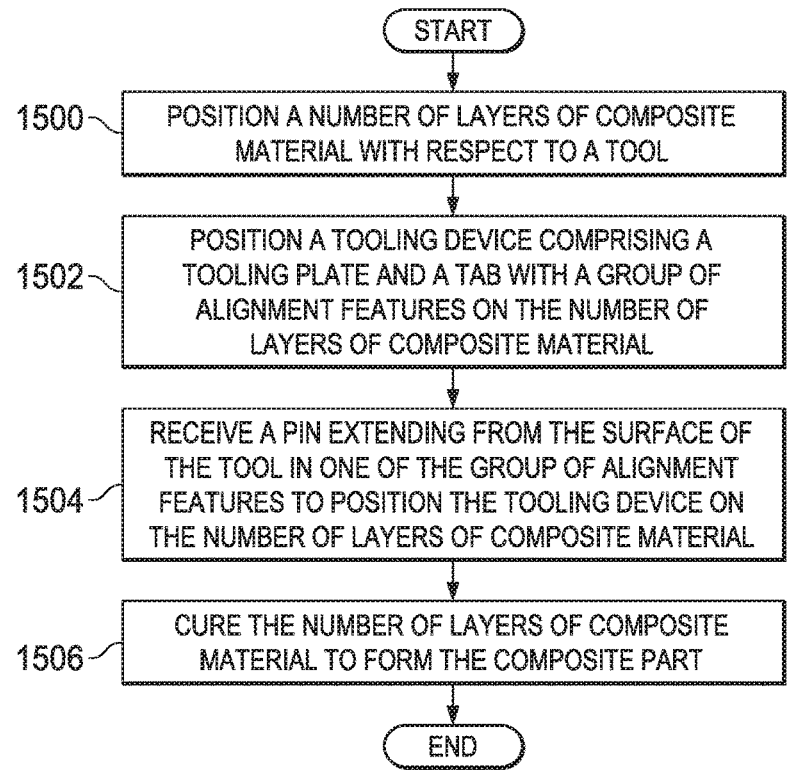

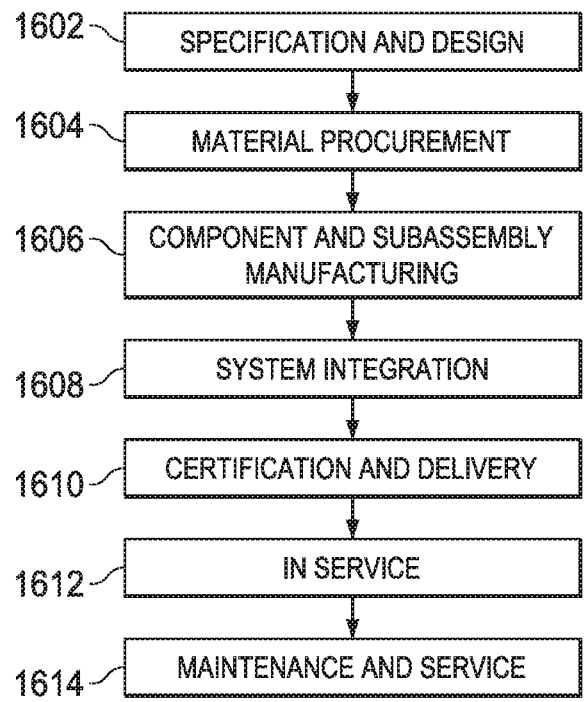
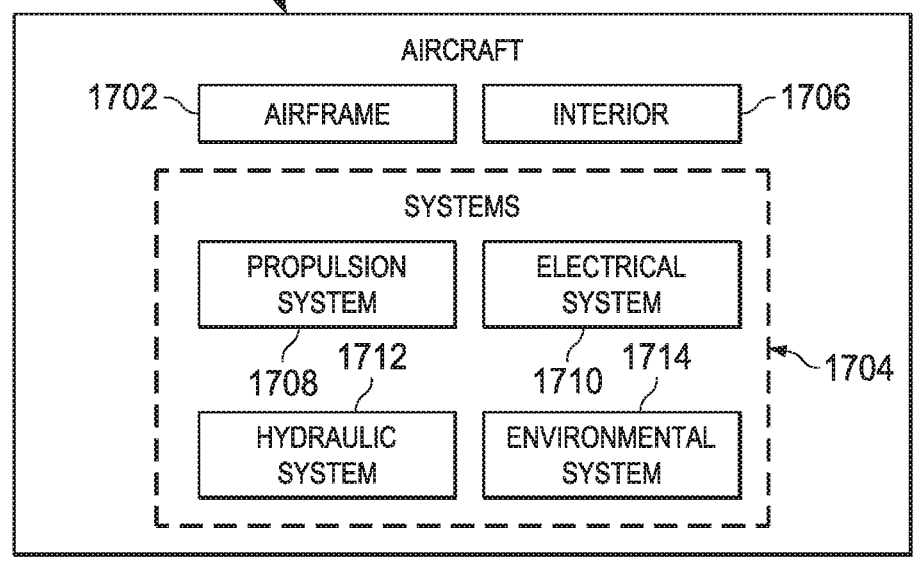

BONDED TAB AND TOOLING DEVICE

CROSS-REFERENCE TO RELATED APPLICATIONS

This application is a divisional of and claims the benefit of priority to U.S. patent application Ser. No. 15/417,023, filed on Jan. 26, 2017 and entitled "Bonded Tab and Tooling Device," now U.S. Pat. No. 10,377,122, issued Aug. 13, 2019, which is a divisional of and claims the benefit of priority to U.S. patent application Ser. No. 14/172,223, filed on Feb. 4, 2014 and entitled "Bonded Tab and Tooling Device," now U.S. Pat. No. 9,579,875, issued Feb. 28, 2017, the contents of both Applications being incorporated herein by reference.

BACKGROUND INFORMATION

1. Field

The present disclosure relates generally to composite materials and, in particular, to manufacturing composite structures. Still more particularly, the present disclosure relates to a method and apparatus for forming shapes in composite structures.

2. Background

Aircraft are being designed and manufactured with greater and greater percentages of composite materials. Composite materials may be used in aircraft to decrease the weight of the aircraft. This decreased weight improves performance features such as payload capacities and fuel efficiencies. Further, composite materials provide longer service life for various components in an aircraft.

Composite materials are strong, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections. Other examples include, without limitation, wing sections joined to form a wing or stabilizer sections joined to form a stabilizer.

In manufacturing composite structures, layers of composite material are typically laid up on a tool. The layers of composite material may be comprised of fibers in sheets. These sheets may take the form of fabrics, tape, tows, or other suitable forms. In some cases, resin may be infused or pre-impregnated into the sheets. These types of sheets are commonly referred to as prepreg.

The different layers of prepreg may be laid up in different orientations and different numbers of layers may be used depending on the thickness of the composite structure being manufactured. These layers of prepreg may be laid up by hand or by using automated lamination equipment such as a tape laminating machine or a fiber placement system.

Oftentimes, tooling devices are used to form surfaces of the composite structure. For instance, a tooling plate may be placed over the layers of composite material to aid in forming a composite part with a desired shape.

The tooling plate is typically placed on the composite part prior to curing. A protective coating may be placed between the composite part and the tooling plate. During curing, the tooling plate transmits pressure, heat, or both pressure and heat to the composite layup. As a result, the tooling plate creates a smooth surface for the composite part.

Tooling plates have various shapes and sizes and are formed from a number of different types of materials. The size and shape of a tooling plate is selected based on the desired shape of the surface of the composite part for which it is used.

After forming the shape of the tooling plate, operations may be performed on the tooling plate to create various features on the tooling plate. These features may include alignment features used to position the tooling plate with respect to the tool used for forming the composite part. For instance, holes may be drilled in the tooling plate to create an alignment feature.

Manufacturing tooling plates in this manner, however, may take more time than desired, increase the risk of error in performing operations on the tooling plate more than desired, or both. For instance, when the tooling plate is made of composite material, operations may be performed on the tooling plate after curing. Performing these operations on the tooling plate after curing may cause undesired inconsistencies to occur in the tooling plate. Examples of inconsistencies include voids, delamination, foreign object debris (FOD), cracks, and other types of inconsistencies. If a composite part is formed from a tooling plate with inconsistencies, that composite part may not have a shape or surface properties that are desired. As a result, the composite part may need to be reworked or discarded.

Moreover, a tooling plate may be used to form a number of composite parts over the lifetime of the tooling plate. After being used for a period of time, the tooling plate may become worn and the alignment features may deform. As a result, the alignment features may not provide a desired level of alignment for the tooling plate when manufacturing composite parts. Therefore, it would be desirable to have a method and apparatus that take into account at least some of the issues discussed above, as well as other possible issues.

SUMMARY

In one illustrative embodiment, an apparatus comprises a tooling plate, a tab co-bonded with the tooling plate, and a group of alignment features associated with the tab. The tooling plate is configured for use with a tool to form a composite part. The group of alignment features is configured to position the tooling plate with respect to the tool used to form the composite part.

In another illustrative embodiment, a method for forming a tooling device is presented. A first number of layers of composite material is laid up on a tool. A tab having a group of alignment features is positioned with respect to the first number of layers of composite material. A second number of layers of composite material is laid up. A portion of the second number of layers of composite material covers a planar structure of the tab. The first number of layers of composite material, the second number of layers of composite material, and the tab are co-bonded to form the tooling device.

In yet another illustrative embodiment, a method for forming a composite part is presented. A number of layers of composite material is positioned with respect to a tool. A tooling device is positioned on the number of layers of composite material. The tooling device comprises a tooling plate and a tab with a group of alignment features co-bonded with the tooling plate.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a flowchart of a process for forming a tooling device in accordance with an illustrative embodiment;

FIG. 15 is an illustration of a flowchart of a process for forming a composite part using a tooling device in accordance with an illustrative embodiment;

FIG. 16 is an illustration of an aircraft manufacturing and service method in the form of a block diagram in accordance with an illustrative embodiment; and FIG. 17 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that it is desirable to position a tooling plate used to form a composite structure such that the tooling plate forms a desired shape in the composite structure. The illustrative embodiments recognize and take into account that one way to position the tooling plate relative to a tool used to form the composite structure is to use an alignment feature in the tooling plate. In an illustrative example, this alignment feature is placed on a pin extending from the surface of the tool used to form the composite structure and positions the tooling plate in a desired manner relative to the composite layup.

The illustrative embodiments recognize and take into account, however, that forming alignment features in a tooling plate may take more time than desired. As an example, the illustrative embodiments recognize and take into account that some currently used processes for manufacturing tooling plates involves performing various operations which increases the time needed to manufacture the tooling plates. For instance, some processes used for manufacturing a tooling plate made of composite material involve curing the composite material and then performing drilling operations, routing operations, or both on the tooling plate to form the alignment features. Performing these operations on the tooling plate after curing increases the risk that inconsistencies will occur and composite parts may be formed having an undesired shape or surface properties.

Thus, the illustrative embodiments provide a method and apparatus for forming a tooling device. In an illustrative embodiment, an apparatus comprises a tooling plate, a tab associated with the tooling plate, and a group of alignment features associated with the tab. The tooling plate is configured for use with a tool to form a composite part. The group of alignment features is configured to position the tooling plate with respect to the tool used to form the composite part.

Figure 1:
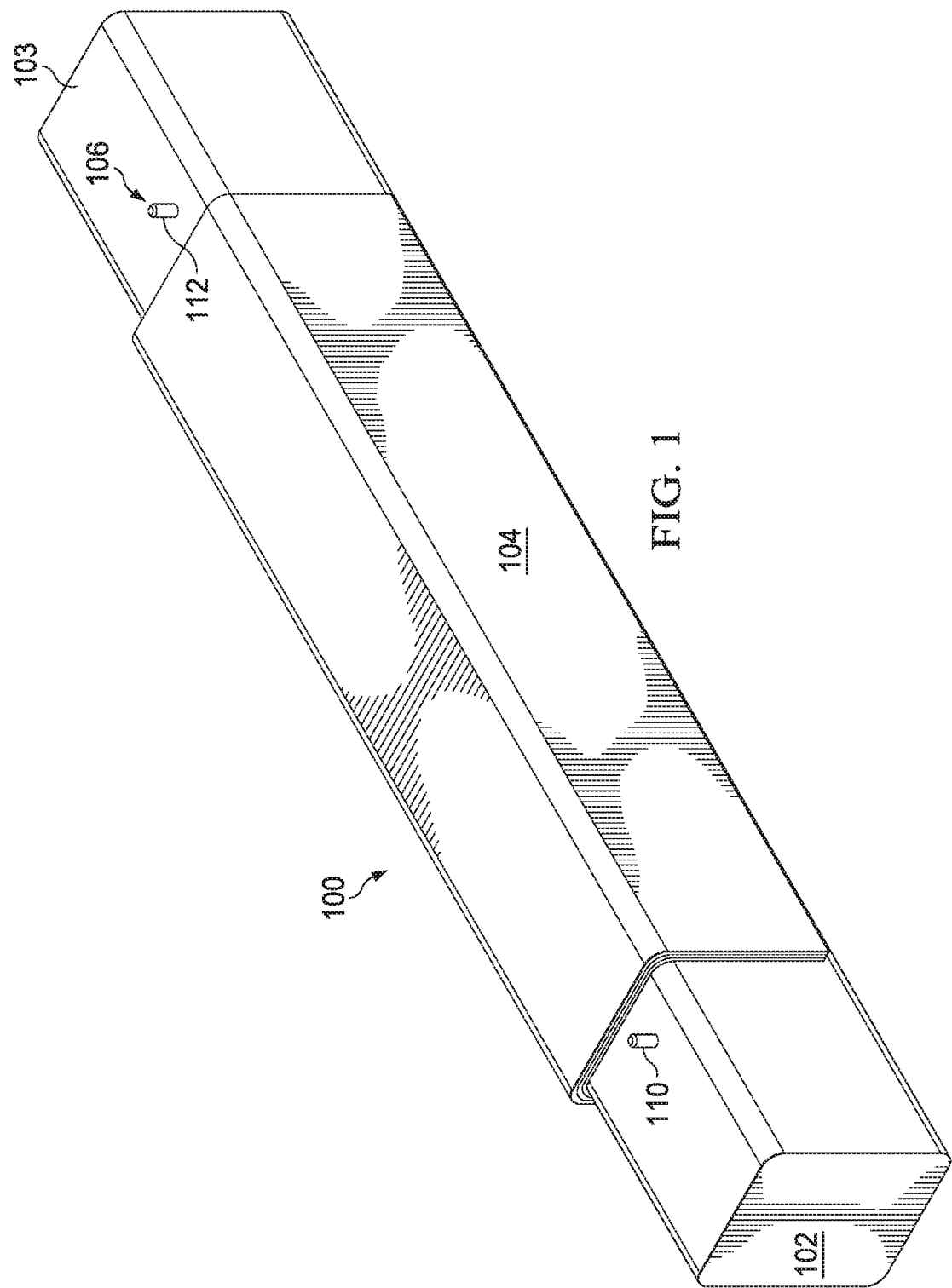
FIG. 1 is an illustration of a tooling system for forming a composite part in accordance with an illustrative embodiment.

Referring now to the figures and, in particular, with reference to FIG. 1, an illustration of a tooling system for forming a composite part is depicted in accordance with an illustrative embodiment. In this depicted example, tooling system 100 includes components used to form a composite part. In this illustrative example, tooling system 100 includes tool 102.

As depicted, tool 102 is a structure used to form the composite part. For example, tool 102 may be a layup mandrel in this illustrative example. Tool 102 has surface 103 on which number of layers of composite material 104 may be laid up. As used herein, a "number of" items may be one or more items. For example, number of layers of composite material 104 is one or more layers of composite material.

In this illustrative example, number of layers of composite material 104 have been positioned with respect to tool 102. In other words, number of layers of composite material 104 have been laid up on tool 102.

Number of layers of composite material 104 may take various forms in this illustrative example. For instance, number of layers of composite material 104 may take the form of fabrics, cloth, tape, tows, and other configurations of composite material. In some illustrative examples, number of layers of composite material 104 may have resin infused within each layer. When resin is infused within number of layers of composite material 104, number of layers of composite material 104 takes the form of prepreg.

In other illustrative examples, number of layers of composite material 104 do not have resin infused within them. In this instance, resin may be infused within number of layers of composite material 104 prior to or during curing, using various impregnation methods.

As depicted, tool 102 includes group of pins 106. Group of pins 106 are devices that extend from surface 103 of tool 102. As used herein, a "group of" items is one or more items. For instance, group of pins 106 is one or more pins.

Group of pins 106 are configured to align a tooling device (not shown) with respect to tool 102 and number of layers of composite material 104. As depicted, group of pins 106 includes pin 110 located on one end of tool 102 and pin 112 located on the opposite end of tool 102.

Figure 2:
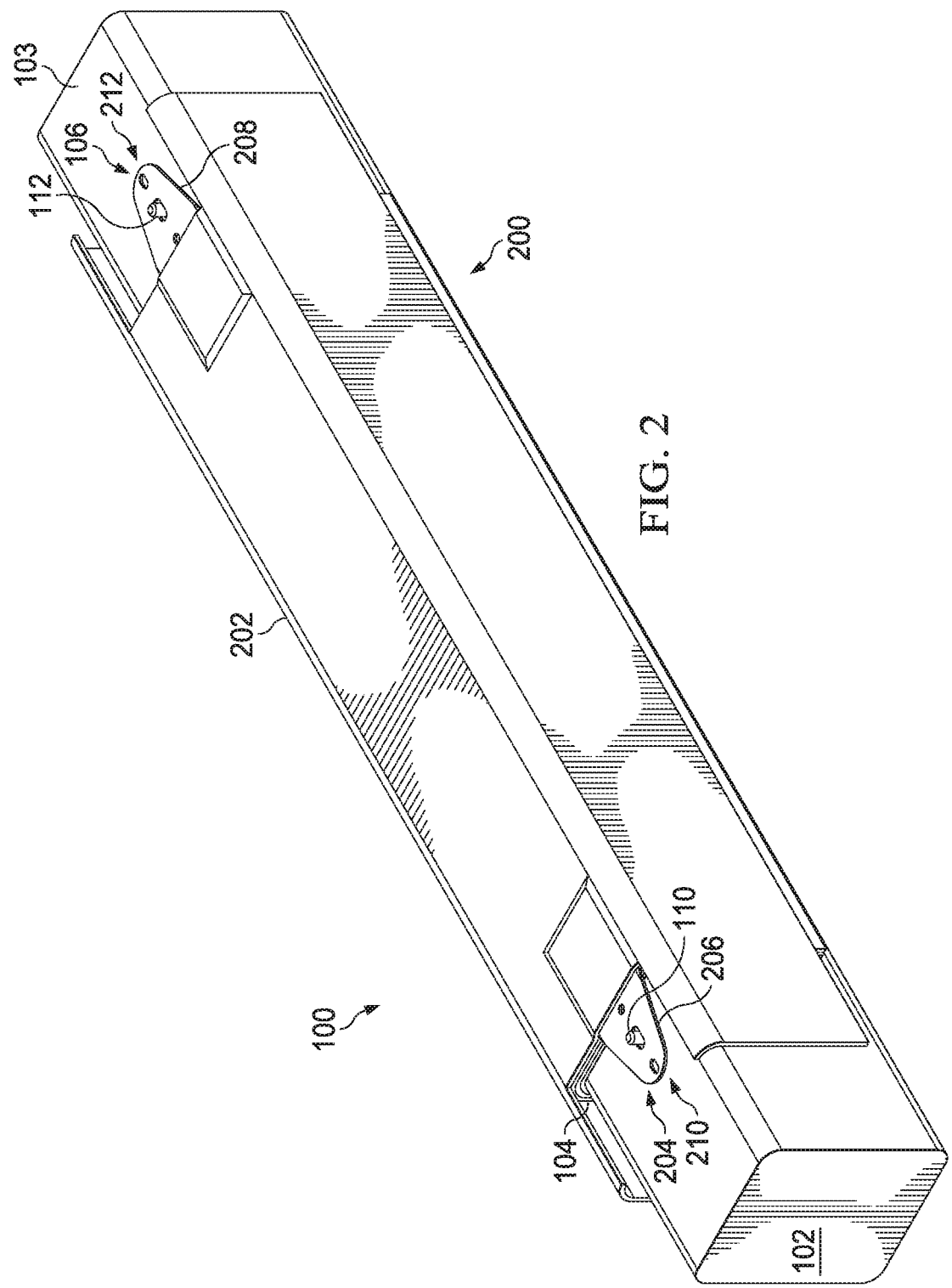
FIG. 2 is an illustration of a tooling system for forming a composite part in accordance with an illustrative embodiment.

Turning next to FIG. 2, an illustration of a tooling system for forming a composite part is depicted in accordance with an illustrative embodiment. In this depicted example, tooling system 100 also includes tooling device 200.

Tooling device 200 is a pre-formed device used to mold a surface of a composite part. In other words, tooling device 200 is formed in a separate process from the formation of the composite part.

In this illustrative example, tooling device 200 is configured to apply a desired level of pressure, heat, or both pressure and heat to number of layers of composite material 104 during curing. Tooling device 200 has been positioned on number of layers of composite material 104 in this illustrative example.

Tooling device 200 is configured to be substantially the same size and shape as the desired part formed from number of layers of composite material 104. In this illustrative example, a protective layer or parting agent (not shown) is placed between number of layers of composite material 104 and tooling device 200.

As depicted, tooling device 200 includes tooling plate 202 and group of tabs 204. Tooling plate 202 is configured for use with tool 102 to form the composite part. In this depicted example, tooling plate 202 is the structural portion of tooling device 200. For example, tooling plate 202 may be a caul plate.

Tooling plate 202 is used to form an outer mold line of the composite part. An "outer mold line" is the outer surface of the composite part. In this manner, tooling plate 202 is configured to form an outer surface of the composite part during curing of number of layers of composite material 104 used to form the composite part. Surface 103 of tool 102 forms the inner mold line, or inner surface, of the composite part.

Tooling plate 202 may include various types of materials in this illustrative example. For instance, tooling plate 202 may include a material selected from at least one of a metal, a metal alloy, cork, a composite material, or some other suitable type of material. In this depicted example, tooling plate 202 comprises a composite material. In particular, tooling plate 202 comprises a first layer of composite material and a second layer of composite material.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, group of tabs 204 is physically associated with tooling plate 202. In this illustrative example, a first component, such as group of tabs 204, may be considered to be associated with a second component, such as tooling plate 202, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of, as an extension of the second component, or a combination thereof.

Group of tabs 204 includes tab 206 and tab 208. Tab 206 and tab 208 are co-bonded with tooling plate 202 to form tooling device 200 in this illustrative example.

When one component is co-bonded with another component, the first component and the second component are bonded together during curing of at least one of the two components. In this case, group of tabs 204 are pre-cured before being bonded with tooling plate 202. As a result, group of tabs 204 subsequently bond to tooling plate 202 as tooling plate 202 is cured. The formation of tooling device 200 occurs in a separate process from forming the composite part.

In this depicted example, group of alignment features 210 is associated with tab 206. In a similar fashion, group of alignment features 212 is associated with tab 208. Group of alignment features 210 and group of alignment features 212 are configured to position tooling plate 202 with respect to tool 102 used to form the composite part. Group of alignment features 210 utilize a central alignment feature in the group of alignment features 210 to position tooling plate 202 with respect to tool 102.

Group of alignment features 210 are openings in this illustrative example. These openings may be holes that may have different shapes. For example, the shape of a hole used as one of group of alignment features 210 may be selected from one of a circular shape, a rectangular shape, a hexagonal shape, a triangular shape, an oval shape, and other suitable types of shapes.

In this illustrative example, one of group of alignment features 210 in tab 206 is configured to receive pin 110 in tool 102, while one of group of alignment features 212 in tab 208 is configured to receive pin 112 in tool 102. In this manner, group of alignment features 210 and group of alignment features 212 are configured to locate and reduce movement of tooling plate 202 in a number of directions with respect to tool 102 when forming the composite part. Additionally, group of alignment features 210 and group of alignment features 212 position tooling plate 202 relative to tool 102 and number of layers of composite material 104 such that the composite part forms with a desired shape.

Figure 3:
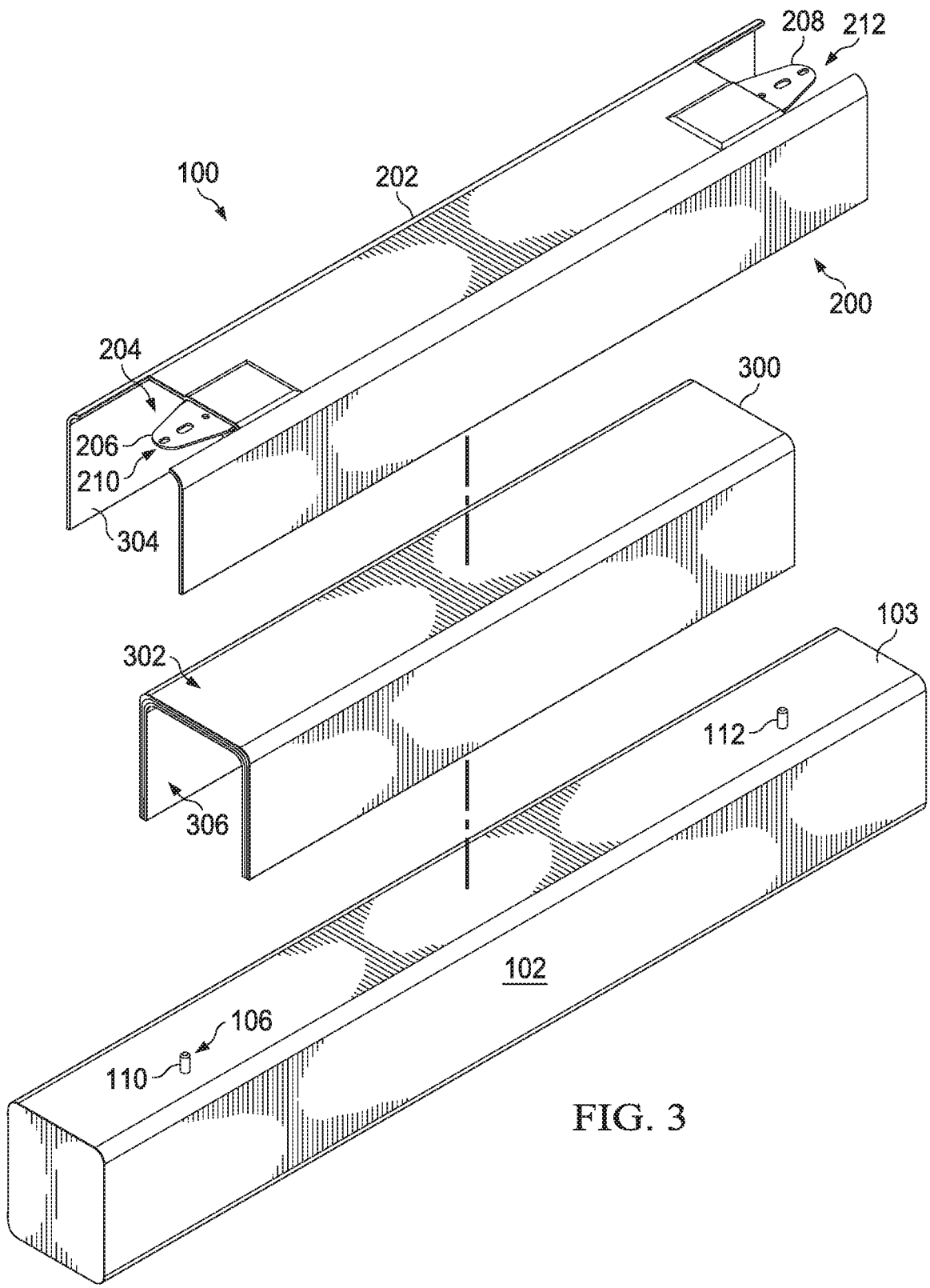
FIG. 3 is an illustration of an exploded view of a tooling system and a composite part in accordance with an illustrative embodiment.

With reference next to FIG. 3, an illustration of an exploded view of a tooling system and a composite part is depicted in accordance with an illustrative embodiment. In this illustrative example, number of layers of composite material 104 from FIG. 1 have been cured to form composite part 300.

Number of layers of composite material 104 may be cured to form composite part 300 using various types of curing processes. These curing processes apply a desired temperature and pressure to number of layers of composite material

104. For instance, a vacuum may be applied to number of layers of composite material 104 on tool 102 using a vacuum bag. Number of layers of composite material 104 may then be placed in an autoclave for a period of time. The vacuum may be applied during curing in the autoclave. In other illustrative examples, other curing processes may be used, depending on the particular implementation.

As seen in this view, tooling plate 202 forms outer mold line 302 of composite part 300. In particular, inner surface 304 of tooling plate 202 forms outer mold line 302. Surface 103 of tool 102 forms inner mold line 306 of composite part 300. Once composite part 300 is formed using tool 102 and tooling device 200, composite part 300 may be removed from tool 102 and installed in an aircraft or other suitable structure.

Figure 4:
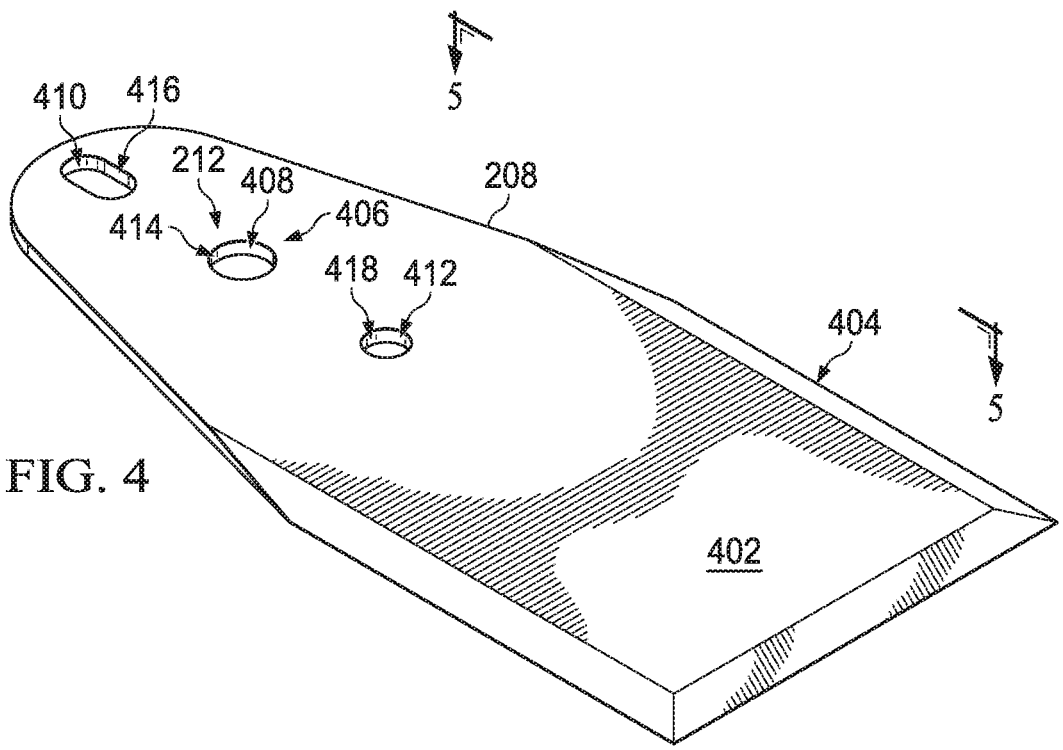
FIG. 4 is an illustration of a perspective view of a tab in accordance with an illustrative embodiment.

Turning now to FIG. 4, an illustration of a perspective view of a tab is depicted in accordance with an illustrative embodiment. In this depicted example, tab 208 with group of alignment features 212 from FIG. 2 is shown before tab 208 has been co-bonded with tooling plate 202.

As depicted, tab 208 may comprise a number of different types of materials. For example, tab 208 may comprise a material selected from at least one of a thermoplastic material, a thermoset material, a phenolic resin, a metal, a metal alloy, fluorinated ethylene propylene, or other suitable types of materials. The material selected for tab 208 is selected such that tab 208 does not deform when being co-bonded with tooling plate 202.

In this illustrative example, tab 208 includes planar structure 402 and a number of chamfered edges 404 in addition to group of alignment features 212. Planar structure 402 is a substantially flat portion of tab 208. Planar structure 402 is configured to provide a bonding surface for bonding tab 208 with the tooling plate.

In this depicted example, chamfered edges 404 are grooved surfaces extending from planar structure 402 in tab 208. Chamfered edges 404 are also configured to provide a bonding surface for bonding tab 208 with the tooling plate. In particular, chamfered edges 404 allow layers of composite material used to form tooling plate 204 to angle downward, reducing the possibility of voids or wrinkles occurring between tab 208 and tooling plate 204 after curing.

As illustrated, group of alignment features 212 are located in planar structure 402 of tab 208. Each of group of alignment features 212 may include features selected from one of an opening, a groove, a slot, a notch, a protrusion, or some other type of feature configured for use in positioning tab 208 with respect to tool 102 in FIG. 1. In this illustrative example, group of alignment features 212 include openings 406 in planar structure 402 of tab 208. Each of openings 406 may have the same or a different shape than the other openings in openings 406.

The shape of each of openings 406 may be selected based on the manner in which tab 208 is positioned with respect to tool 102. For instance, when openings 406 are used to receive pins extending from surface 103 of tool 102 in FIG. 1, openings 406 may be shaped to reduce the movement of tab 208, and tooling plate 202 attached to tab 208, in a number of directions while operations are being performed using tool 102. As an example, openings 406 may be shaped such that tooling plate 202 attached to tab 208 does not rotate about an axis.

In this depicted example, group of alignment features 212 comprises first alignment feature 408, second alignment feature 410, and third alignment feature 412. First alignment feature 408, second alignment feature 410, and third alignment feature 412 are formed in tab 208 prior to co-bonding tab 208 with tooling plate 202 to form tooling device 200. In other words, first alignment feature 408, second alignment feature 410, and third alignment feature 412 are pre-machined. As a result, operations to form first alignment feature 408, second alignment feature 410, and third alignment feature 412 are not performed after curing of tooling device 200.

In this depicted example, tooling device 200 is formed on a tool separate from tool 102 used to form composite part 300 in FIG. 3. The tool used to form tooling device 200 also has pins extending from the surface of the tool. These pins are used to position the tab with respect to the tool.

First alignment feature 408 is associated with tool 102 used to form composite part 300. Tool 102 is a first tool in this illustrative example. Second alignment feature 410 and third alignment feature 412 are associated with a second tool used to form tooling device 200.

As depicted, first alignment feature 408 is configured to position tooling plate 202 attached to tab 208 with respect to tool 102 for forming composite part 300. In this illustrative example, first alignment feature 408 includes opening 414 configured to receive pin 112 associated with tool 102 in FIG. 1.

Second alignment feature 410 is configured to position tab 208 with respect to a second tool for forming tooling device 200. In this depicted example, second alignment feature 410 includes opening 416 configured to receive a first pin associated with the second tool for forming tooling device 200.

Third alignment feature 412 is also configured to position tab 208 with respect to the second tool for forming tooling device 200. In this illustrative example, third alignment feature 412 includes opening 418 configured to receive a second pin associated with the second tool for forming tooling device 200.

In this illustrative example, tab 208 is configured to be co-bonded with tooling plate 202 on one end of tooling plate 202. A number of additional tabs may be co-bonded with tooling plate 202 in various locations along tooling plate 202.

Figure 5:
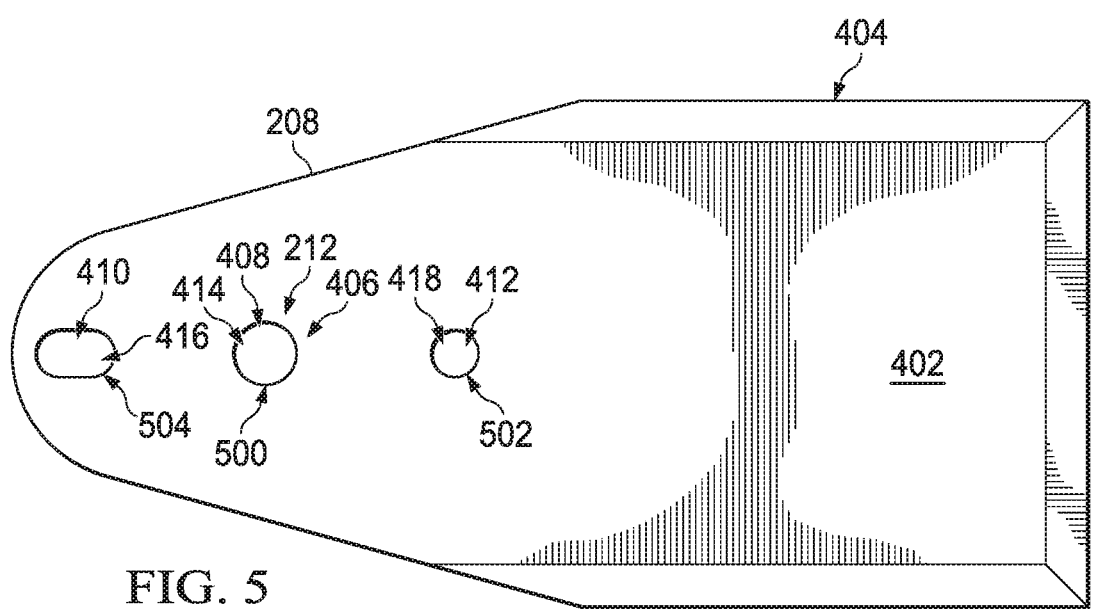
FIG. 5 is an illustration of a top view of a tab in accordance with an illustrative embodiment.

Referring next to FIG. 5, an illustration of a top view of a tab is depicted in accordance with an illustrative embodiment. In this illustrative example, a view of tab 208 in the direction of lines 5-5 in FIG. 4 is shown. The shape of openings 406 is shown in greater detail in this view.

As depicted, opening 414 has circular shape 500. Circular shape 500 of opening 414 controls movement of tooling device 200 with respect to tool 102 when pin 112 in FIG. 1 and FIG. 2 is received by tab 208. In this illustrative example, circular shape 500 of opening 414 reduces movement of tooling device 200 in FIG. 2 in three directions. In particular, circular shape 500 of opening 414 reduces movement of tooling device 200 in the x-direction, the y-direction, and the z-direction when received by pin 112 of tool 102.

In this illustrative example, opening 418 has circular shape 502. Circular shape 502 of opening 418 controls movement of tab 208 with respect to the second tool used to form tooling device 200. In this illustrative example, circular shape 502 of opening 418 reduces movement of tab 208 in the x-direction, the y-direction, and the z-direction when tab 208 is being bonded to tooling plate 202.

As illustrated, opening 416 has oval shape 504. Oval shape 504 of opening 416 controls movement of tab 208 with respect to the second tool used to form tooling device 200. In this illustrative example, oval shape 504 of opening 416 reduces rotation of tab 208 when tab 208 is being bonded to tooling plate 202. In this manner, opening 416 and opening 418 reduce undesired movement of tab 208 while tooling device 200 is being formed.

Figure 6:
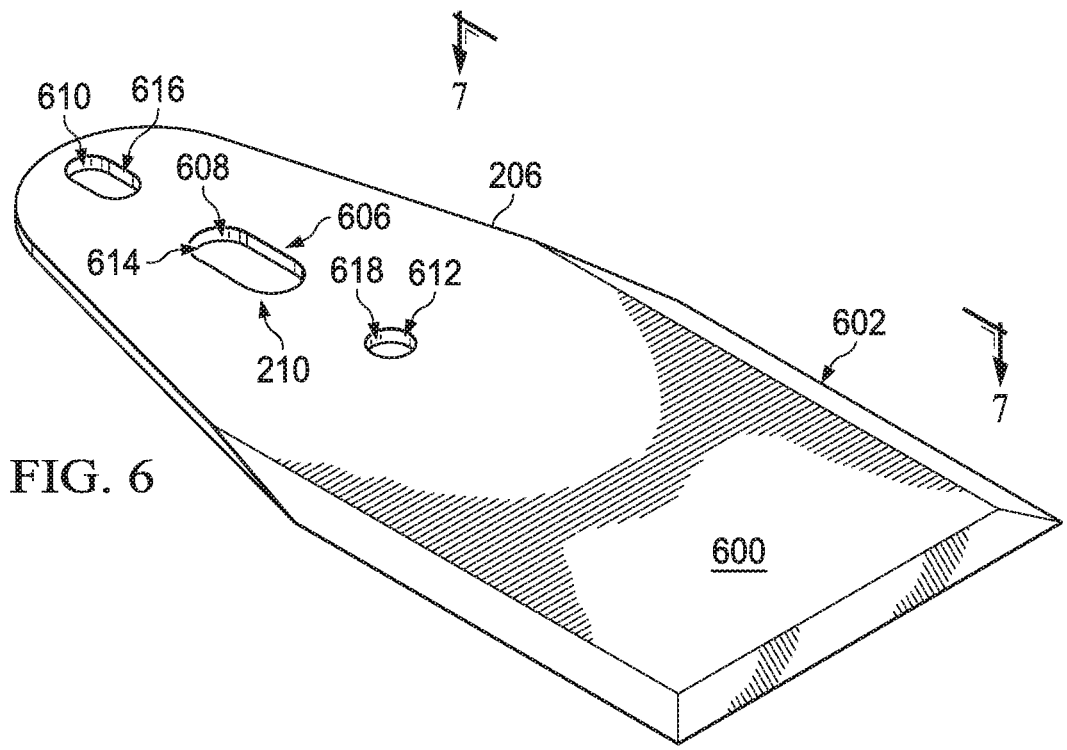
FIG. 6 is an illustration of a perspective view of a tab in accordance with an illustrative embodiment.

With reference now to FIG. 6, an illustration of a perspective view of a tab is depicted in accordance with an illustrative embodiment. In this depicted example, tab 206 from FIG. 2 is shown before tab 206 has been co-bonded with tooling plate 202.

As depicted, tab 206 may comprise the same or a different type of material than tab 208. In a similar fashion to tab 208, the material selected for tab 206 is selected such that tab 206 does not deform when being co-bonded to tooling plate 202.

In this illustrative example, tab 206 includes planar structure 600 and chamfered edges 602 in addition to group of alignment features 210. Group of alignment features 210 includes openings 606 in planar structure 600 of tab 206. Group of alignment features 210 are pre-machined in this illustrative example. In other words, group of alignment features 210 are formed prior to bonding tab 206 with tooling plate 202.

As depicted, openings 606 have a shape selected from one of a circular shape, a rectangular shape, a hexagonal shape, a triangular shape, an oval shape, and some other suitable type of shape. Each of openings 606 may have the same or a different shape than the other openings in openings 606.

The shape of each of openings 606 may be selected based on the manner in which tab 206 is positioned with respect to a tool. For instance, openings 606 may be shaped such that the movement of tooling plate 202, attached to tab 206, is reduced in a number of directions when operations are performed using tool 102 in FIG. 1 and FIG. 2.

In this depicted example, group of alignment features 210 comprises first alignment feature 608, second alignment feature 610, and third alignment feature 612. First alignment feature 608 is associated with tool 102 used to form composite part 300 in FIG. 3. Second alignment feature 610 and third alignment feature 612 are associated with a second tool used to form tooling device 200 in FIG. 2.

As depicted, first alignment feature 608 is configured to position tooling plate 202 attached to tab 206 with respect to tool 102 for forming composite part 300. In this illustrative example, first alignment feature 608 includes opening 614 configured to receive pin 112 associated with tool 102 in FIG. 1.

Second alignment feature 610 is configured to position tab 206 with respect to a second tool for forming tooling device 200. In this depicted example, second alignment feature 610 includes opening 616 configured to receive a third pin associated with the second tool for forming tooling device 200.

Third alignment feature 612 is also configured to position tab 206 with respect to the second tool for forming tooling device 200. In this illustrative example, third alignment feature 612 includes opening 618 configured to receive a fourth pin associated with the second tool for forming tooling device 200. Tab 206 is configured to be co-bonded with tooling plate 202 on the opposite end of tooling plate 202 from tab 208.

Although three alignment features are shown in group of alignment features 210 in tab 206 and group of alignment features 212 in tab 208, more or fewer alignment features may be present in tab 206, tab 208, or both. For instance, two alignment features, three alignment features, ten alignment features, or some other number of alignment features may be present in tab 206, tab 208, or both.

Figure 7:
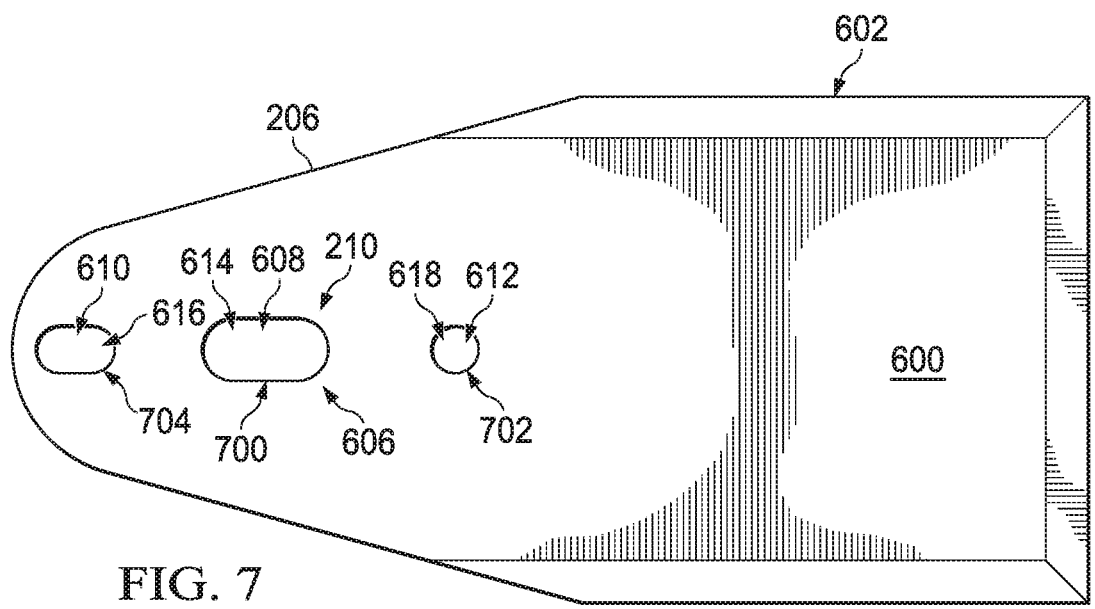
FIG. 7 is an illustration of a top view of a tab in accordance with an illustrative embodiment.

Turning now to FIG. 7, an illustration of a top view of a tab is depicted in accordance with an illustrative embodiment. In this illustrative example, a view of tab 206 in the direction of lines 7-7 in FIG. 6 is shown. The shape of openings 606 is shown in greater detail in this view.

As depicted, opening 614 has oval shape 700. Oval shape 700 of opening 614 controls movement of tooling device 200 with respect to tool 102 in FIG. 1 and FIG. 2. In particular, oval shape 700 of opening 614 reduces rotation of tooling device 200 when pin 112 is received in opening 614 and pin 110 is received in opening 616 of tab 206 in FIG. 2. As a result, tab 206 and tab 208 control movement of tooling device 200 such that tooling device 200 does not move or rotate in an undesired manner.

Additionally, tab 206 and tab 208 position tooling device 200 with respect to tool 102 to properly align tooling device 200 on tool 102. Oval shape 700 of opening 614 allows some free play while still controlling the rotation. This free play aids in fitting tooling device 200 on pin 110 and pin 112 of tool 102. For instance, if the distance between pin 110 and pin 112 is not exactly the same as the distance between opening 616 and opening 614, the free play within opening 614 allows tooling device 200 to still be positioned properly with respect to tool 102.

In this illustrative example, opening 618 has circular shape 702. Circular shape 702 of opening 618 reduces movement of tab 206 in the x-direction, the y-direction, and the z-direction when tab 206 is being bonded to tooling plate 202.

As illustrated, opening 616 has oval shape 704. Oval shape 704 of opening 616 reduces rotation of tab 206 when tab 206 is being bonded to tooling plate 202. In this manner, opening 616 and opening 618 reduce undesired movement of tab 206 while tooling device 200 is being formed.

Figure 8:
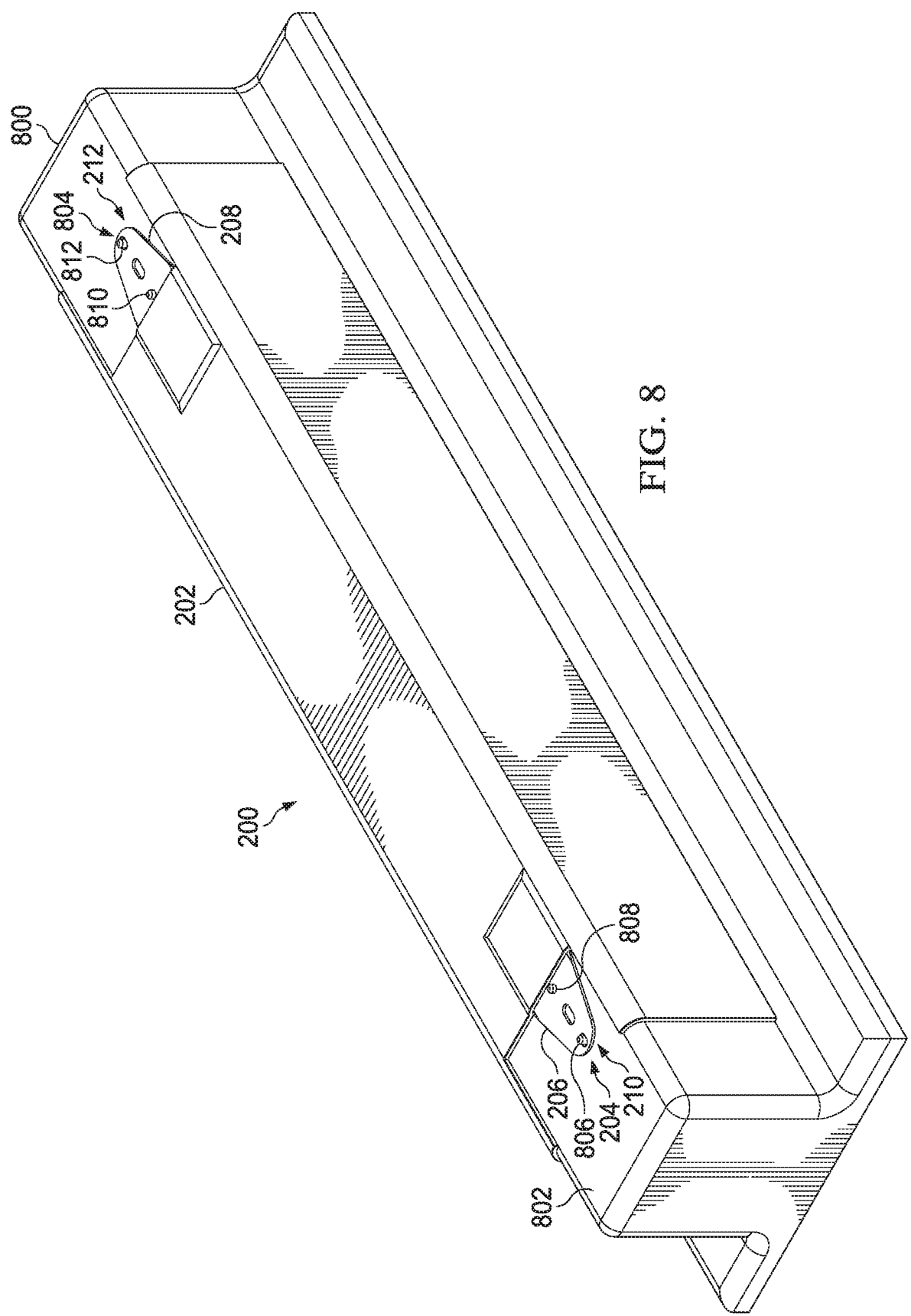
FIG. 8 is an illustration of a tooling device formed on a tool in accordance with an illustrative embodiment.

With reference next to FIG. 8, an illustration of a tooling device formed on a tool is depicted in accordance with an illustrative embodiment. In this depicted example, tooling device 200 is shown after being formed on tool 800. Tool 800 is a second tool in this illustrative example. Tool 800 is used to form tooling device 200 prior to using tooling device 200 in tooling system 100 to form composite part 300 shown in FIG. 3.

As depicted, tool 800 has surface 802 on which a number of layers of composite material may be laid up to form tooling plate 202. Tool 800 forms the shape of inner surface 304 of tooling plate 202 in FIG. 3. As tooling plate 202 is cured, tab 206 and tab 208 are co-bonded to tooling plate 202.

In this illustrative example, tool 800 includes group of pins 804. Group of pins 804 are devices that extend from surface 802 of tool 800. Group of pins 804 are configured to align tab 206 and tab 208 with respect to tool 800. Group of pins 804 are spaced such that tab 206 and tab 208 fit properly with respect to tool 102 for forming composite part 300 shown in FIG. 3. For example, group of pins 804 are spaced such that opening 414 in tab 208 in FIG. 4 and opening 614 in tab 206 in FIG. 6 align with pin 112 and pin 110, respectively, when positioned on tool 102 in FIG. 1 and FIG. 2.

Group of pins 804 includes pin 806, pin 808, pin 810, and pin 812. Pin 806 and pin 808 are located on one end of tool 800, while pin 810 and pin 812 are located on the opposite end of tool 800. In this illustrative example, opening 616 and opening 618 in tab 206 shown in FIG. 6 are configured to receive pin 806 and pin 808, respectively. In a similar fashion, opening 416 and opening 418 in tab 208 shown in FIG. 4 are configured to receive pin 810 and pin 812, respectively.

Tooling plate 202 is co-bonded with tab 206 and tab 208 while tab 206 and tab 208 are positioned on group of pins 804. Tooling device 200 is shown after curing in this illustrative example.

Figure 9:
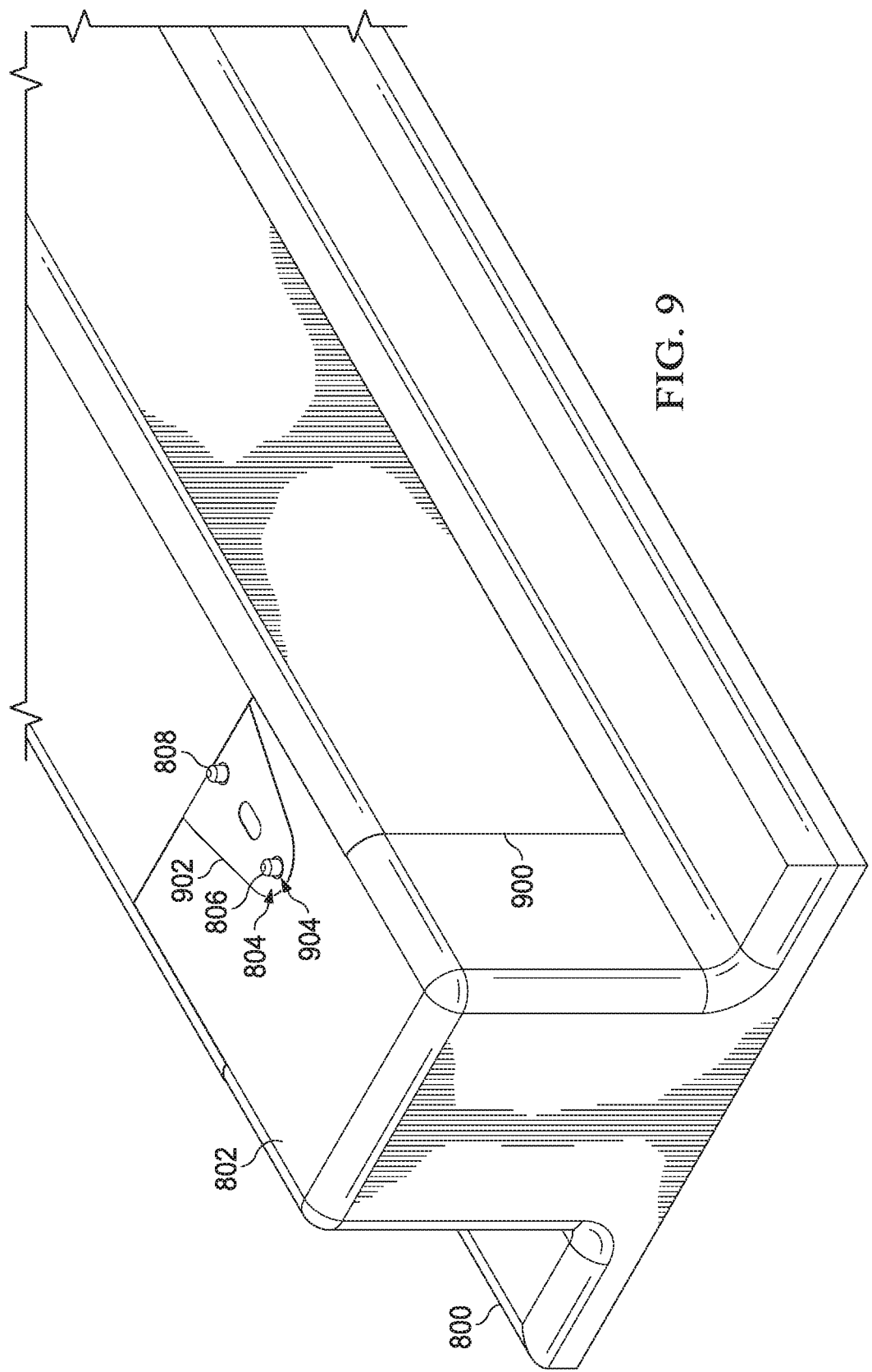
FIG. 9 is an illustration of a first number of layers of composite material on a tool in accordance with an illustrative embodiment.
Figure 10:
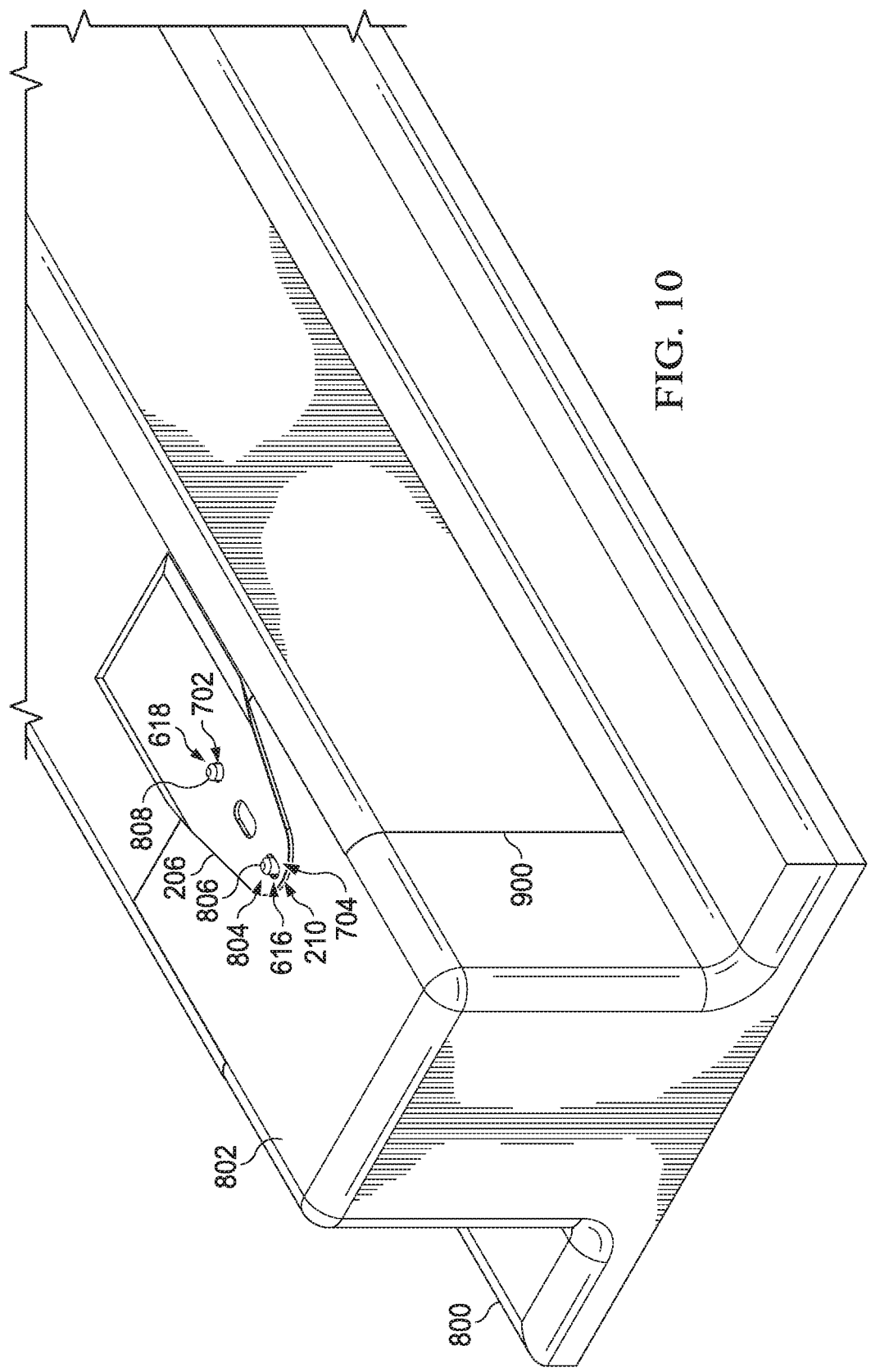
FIG. 10 is an illustration of a tab and a first number of layers of composite material on a tool in accordance with an illustrative embodiment.
Figure 11:
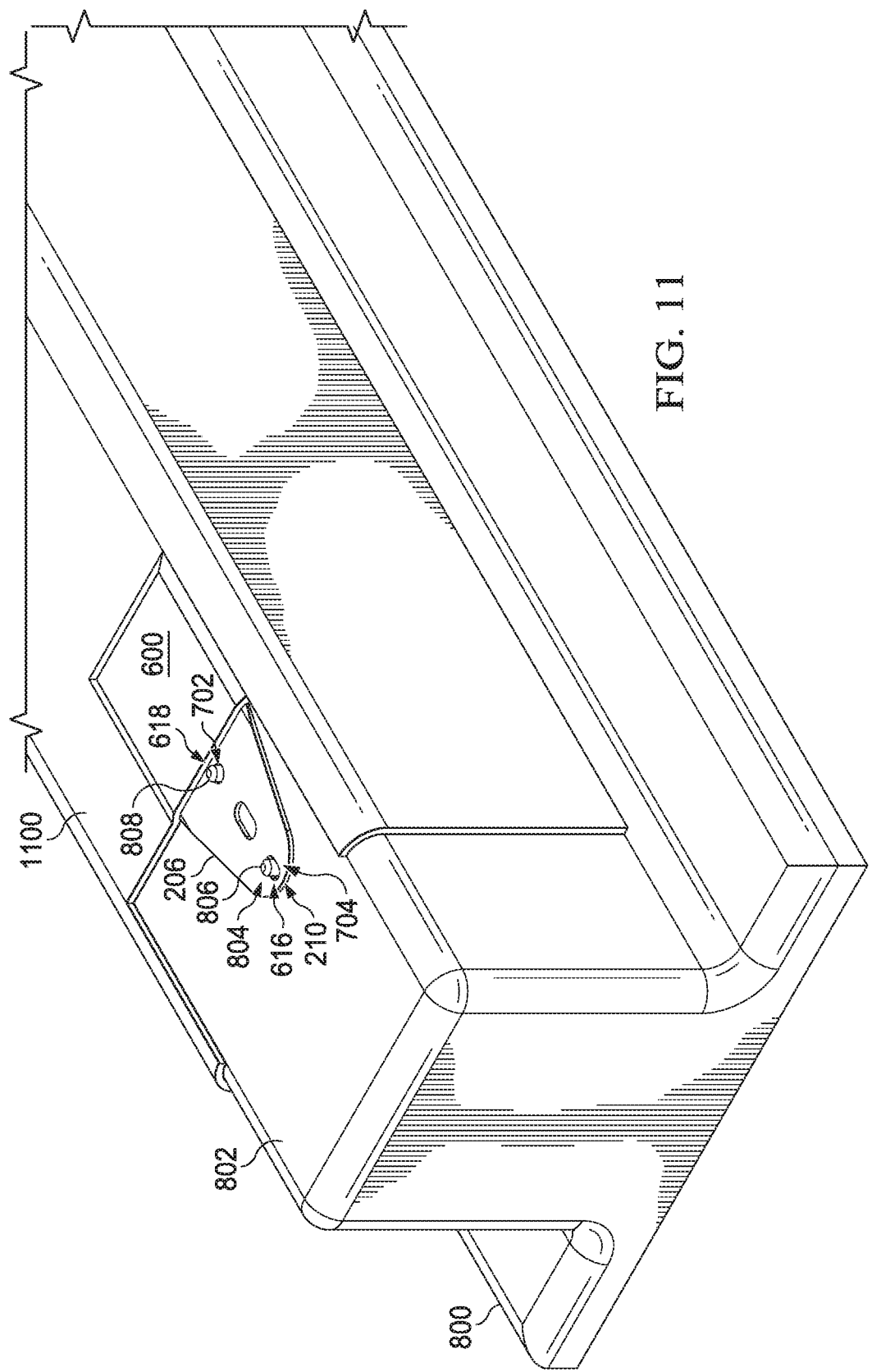
FIG. 11 is an illustration of a second number of layers of composite material on a tool in accordance with an illustrative embodiment.

FIGS. 9-11 depict tooling device 200 on tool 800 during various steps of formation of tooling device 200. Specifically, FIGS. 9-12 depict the formation of tooling device 200 and the co-bonding of tab 206 and tooling plate 202. Tab 208 is co-bonded with tooling plate 202 at the same time and in the same manner as tab 206.

Turning to FIG. 9, an illustration of a first number of layers of composite material on a tool is depicted in accordance with an illustrative embodiment. In this depicted example, first number of layers of composite material 900 have been laid up on tool 800.

First number of layers of composite material 900 may include four layers of composite material in this illustrative example. In other illustrative examples, more or fewer layers may be used, depending on the particular implementation.

As depicted, spacer 902 has been placed on tool 102. Spacer 902 has substantially the same thickness as first number of layers of composite material 900. This thickness for spacer 902 allows tab 206 (not shown in this view) to rest on a coplanar surface. Spacer 902 may take the form of a shim in this illustrative example. Spacer 902 includes clearance holes 904 for pin 806 and pin 808. Spacer 902 has a width and a length that allows the portion of tab 206 extending beyond first number of layers of composite material 900 to be fully supported. Spacer 902 supports tab 206 during various operations performed to form tooling device 200.

In FIG. 10, an illustration of a tab and a first number of layers of composite material on a tool is depicted in accordance with an illustrative embodiment. In this depicted example, tab 206 having group of alignment features 210 has been placed on top of first number of layers of composite material 900.

In this illustrative example, tab 206 is placed on top of first number of layers of composite material 900 such that pin 806 of tool 800 is received by opening 616 and pin 808 of tool 800 is received by opening 618. In this illustrative example, a portion of tab 206 is also placed on top of spacer 902. Circular shape 702 of opening 618 and oval shape 704 of opening 616 control movement of tab 206.

With reference now to FIG. 11, an illustration of a second number of layers of composite material on a tool is depicted in accordance with an illustrative embodiment. In this depicted example, second number of layers of composite material 1100 is laid up on tool 800. Second number of layers of composite material 1100 may include four layers or some other number of layers.

As depicted, second number of layers of composite material 1100 are laid up on tab 206 such that a portion of second number of layers of composite material 1100 covers planar structure 600 of tab 206. Tab 206 is located between first number of layers of composite material 900 and second number of layers of composite material 1100 prior to co-bonding first number of layers of composite material 900, second number of layers of composite material 1100, and tab 206. First number of layers of composite material 900 and second number of layers of composite material 1100 are now ready to be cured to form tooling plate 202 with tab 206 co-bonded to tooling plate 202.

As first number of layers of composite material 900 and second number of layers of composite material 1100 are cured, tab 206 is co-bonded with first number of layers of composite material 900 and second number of layers of composite material 1100 to form tooling device 200. As a result, tooling plate 202, tab 206, and tab 208 shown in FIG. 2 form an indexed caul plate.

Other processes in addition to, or in place of, the ones shown and described in FIGS. 9-11 may be performed during formation of tooling device 200. For instance, a layer of resin tape may be placed on group of alignment features 210 to maintain a shape of group of alignment features 210. In this illustrative example, the resin tape takes the form of fluorinated ethylene propylene (FEP). This resin tape reduces bleeding of resin into openings 606. Resin tape also may be placed at the interface of tab 206 and first number of layers of composite material 900, as well as at the interface of tab 208 and second number of layers of composite material 1100.

Figure 12:
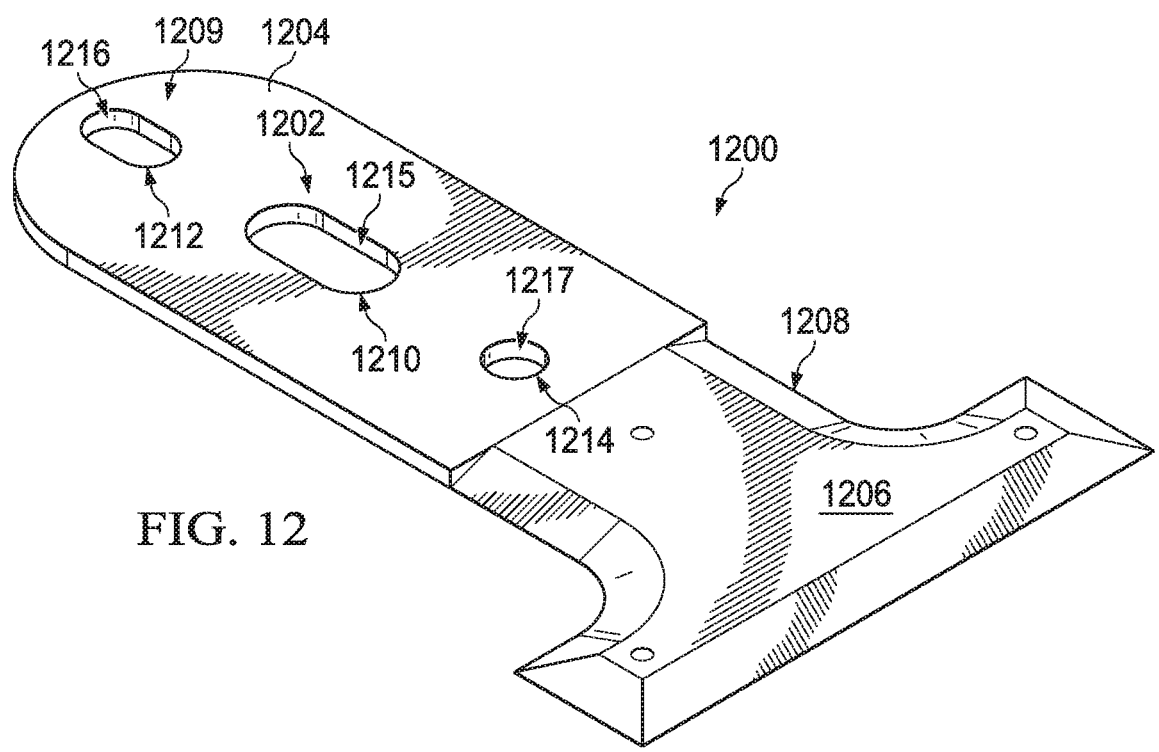
FIG. 12 is an illustration of a perspective view of a tab in accordance with an illustrative embodiment.

With reference next to FIG. 12, an illustration of a perspective view of a tab is depicted in accordance with an illustrative embodiment. In this illustrative example, tab 1200 is an example of another implementation of a tab profile for a tooling device.

As illustrated, tab 1200 has group of alignment features 1202, planar structure 1204, and planar structure 1206. Planar structure 1206 includes chamfered edges 1208, while planar structure 1204 includes group of alignment features 1202. Planar structure 1206 is configured to provide a bonding surface for bonding tab 1200 with a tooling plate.

In this depicted example, group of alignment features 1202 takes the form of openings 1209. Group of alignment features 1202 include first alignment feature 1210, second alignment feature 1212, and third alignment feature 1214. Opening 1215, opening 1216, and opening 1217 correspond to first alignment feature 1210, second alignment feature 1212, and third alignment feature 1214, respectively.

In this illustrative example, first alignment feature 1210 positions tab 1200 with respect to a tool for forming a composite structure. Second alignment feature 1212 and third alignment feature 1214 position tab 1200 with respect to the tool for forming the tooling device and holding tab 1200 in a desired position when co-bonding tab 1200 with the tooling plate. Similar to tab 206 and tab 208 from FIG. 2, operations performed on tab 1200 occur prior to bonding tab 1200 with the tooling plate.

Figure 13:
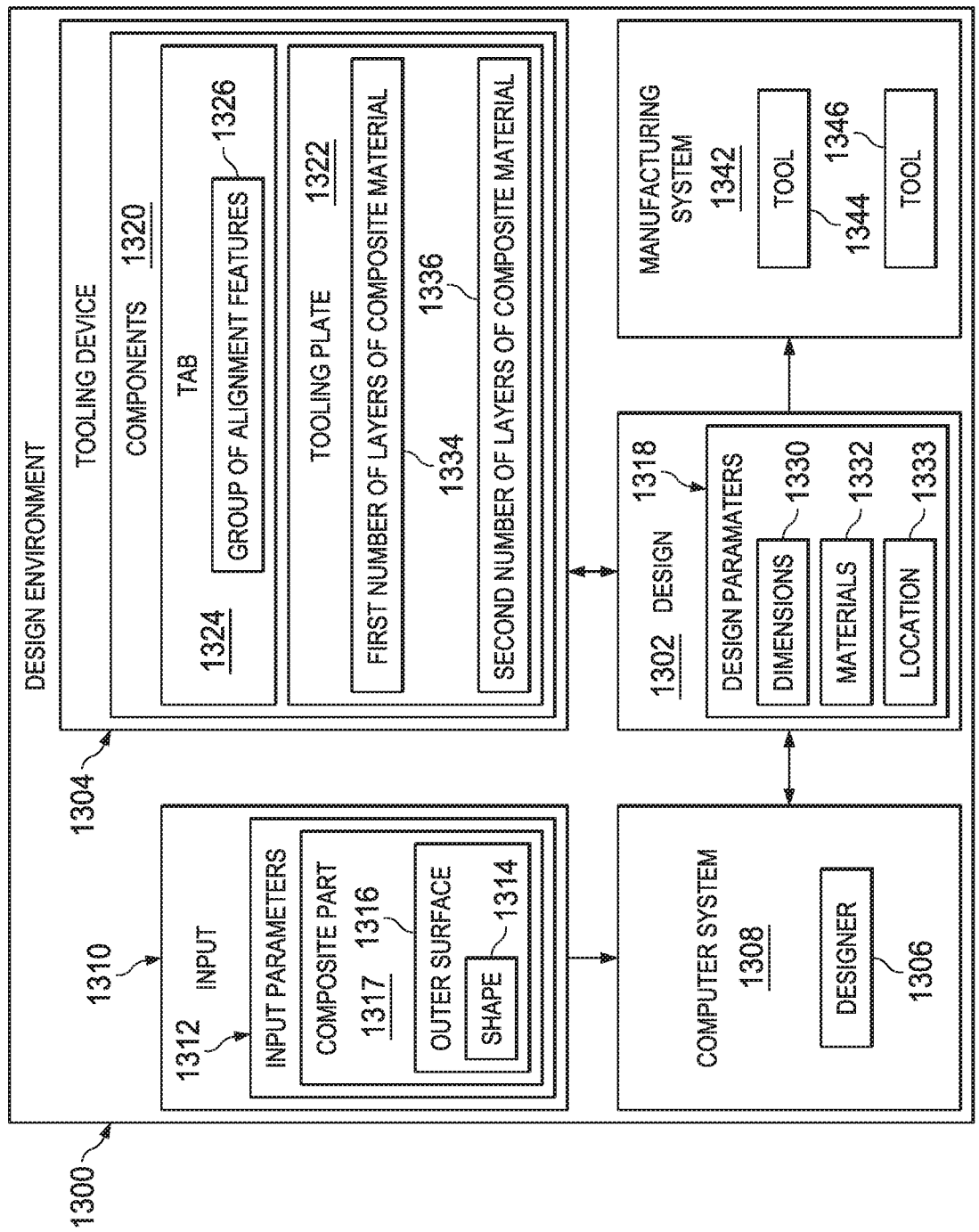
FIG. 13 is an illustration of a block diagram of a tooling device design environment in accordance with an illustrative embodiment.

With reference now to FIG. 13, an illustration of a block diagram of a tooling device design environment is depicted in accordance with an illustrative embodiment. As depicted, design environment 1300 is configured to generate design 1302 for tooling device 1304 and also may be used to manufacture tooling device 1304. Tooling device 200 in FIG. 2 is an example of a physical implementation for tooling device 1304 shown in this figure.

In the illustrative example, designer 1306 is configured to generate design 1302 and may be implemented in software, hardware, firmware or a combination thereof. When software is used, the operations performed by designer 1306 may be implemented in program code configured to run on a processor unit. When firmware is used, the operations performed by designer 1306 may be implemented in program code as data and stored in persistent memory to run on a processor unit. When hardware is employed, the hardware may include circuits that operate to perform the operations by designer 1306.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components, integrated with inorganic components, comprised entirely of organic components excluding a human being, or a combination thereof. For example, the processes may be implemented as circuits in organic semiconductors.

In this illustrative example, designer 1306 is located in computer system 1308. Computer system 1308 is comprised of a number of computers. When more than one computer is present in computer system 1308, those computers may communicate with each other through a communications medium such as a network.

As depicted, designer 1306 may receive input 1310 for use in generating design 1302 for tooling device 1304. For example, input 1310 may include input parameters 1312. Input parameters 1312 may describe, for example, shape 1314 of outer surface 1316 of composite part 1317 formed using tooling device 1304 and other suitable parameters. For example, input parameters 1312 may include the shape of outer mold line 302 desired for composite part 300 formed using tooling device 200 and tool 102 as shown in FIG. 3.

Using input 1310, designer 1306 is configured to generate design 1302. In particular, designer 1306 may generate design parameters 1318 for tooling device 1304.

As depicted, design parameters 1318 may include various parameters. For example, design parameters 1318 may describe components 1320 in tooling device 1304. Components 1320 may include, for example, at least one of tooling plate 1322 and tab 1324. Tab 1324 includes group of alignment features 1326 in this illustrative example.

As illustrated, design parameters 1318 may include at least one of dimensions 1330, materials 1332, location 1333, or other suitable parameters to describe the various components in tooling device 1304.

For example, dimensions 1330 and materials 1332 may be used to customize tooling plate 1322 in a manner that is desired for tooling device 1304 to form shape 1314 of outer surface 1316 of composite part 1317 as specified in input 1310. For example, dimensions 1330 may be used to describe first number of layers of composite material 1334 and second number of layers of composite material 1336 in tooling plate 1322.

In the illustrative examples, dimensions 1330 may take various forms. These forms may include those for the illustrative examples depicted in FIGS. 1-3 and 8-11.

Materials 1332 may be used to describe materials for tab 1324. Dimensions 1330 may also include an identification of dimensions for tab 1324, the shape of group of alignment features 1326, or both.

In this illustrative example, location 1333 describes the location of group of alignment features 1326 in tab 1324. Location 1333 also includes the location of the placement of tab 1324 with respect to first number of layers of composite material 1334, second number of layers of composite material 1336, or both when forming tooling device 1304.

Design 1302 may be used by manufacturing system 1342 to manufacture tooling device 1304. Specifically, tool 1344 in manufacturing system 1342 is used to manufacture tooling device 1304. Once tooling device 1304 is manufactured, composite part 1317 is formed using tool 1346 in manufacturing system 1342.

The illustrations of design environment 1300 and the components within design environment 1300 in FIG. 13 are not meant to imply physical or architectural limitations to the manner in which an illustrative embodiment may be implemented. Other components in addition to or in place of the ones illustrated may be used. Some components may be optional.

The different components shown in FIGS. 1-12 may be illustrative examples of how components shown in block form in FIG. 1 can be implemented as physical structures. Additionally, some of the components in FIGS. 1-12 may be combined with components in FIG. 13, used with components in FIG. 13, or a combination of the two.

For example, although tooling plate 202 has been described as forming a smooth surface for outer mold line 302 of composite part 300 shown in FIG. 3, tooling plate 202 also may be used to form a textured surface. In other illustrative examples, more or fewer alignment features may be present in group of alignment features 210, group of alignment features 212, or both.

In still other illustrative examples, group of alignment features 210 and group of alignment features 212 take other forms other than openings. For instance, in some illustrative examples, at least one of group of alignment features 210 or group of alignment features 212 may be grooves.

With reference now to FIG. 14, an illustration of a flowchart of a process for forming a tooling device is depicted in accordance with an illustrative embodiment. The process illustrated in FIG. 14 may be implemented in design environment 1300 in FIG. 13. In particular, the process may be used to form tooling device 1304 from tooling plate 1322 and tab 1324.

The process begins by laying up a first number of layers of composite material on a tool (operation 1400). The process then positions a tab having a group of alignment features with respect to the first number of layers of composite material (operation 1402). In some illustrative example, more than one tab may be positioned on the first number of layers of composite material. The tab may be positioned on the tool using the group of alignment features. The group of alignment features are pre-machined in the tab prior to the tab being positioned on the first number of layers of composite material.

Next, the process positions a spacer between the tool and a lower surface of the tab (operation 1404). The spacer takes the form of a shim and is used to support the tab during co-bonding of the tab, the first number of layers of composite material, and the second number of layers of composite material.

Thereafter, the process lays up a second number of layers of composite material (operation 1406). In operation 1406, a portion of the second number of layers of composite material covers a planar structure of the tab.

The process then co-bonds the first number of layers of composite material, the second number of layers of composite material, and the tab to form the tooling device (operation 1408) with the process terminating thereafter. In operation 1408, the tab is bonded to the first number of layers of composite material and the second number of layers of composite material, as those layers cure.

Turning next to FIG. 15, an illustration of a flowchart of a process for forming a composite part using a tooling device is depicted in accordance with an illustrative embodiment. The process illustrated in FIG. 15 may be implemented in design environment 1300 in FIG. 13. In particular, the process may be used to form composite part 1317 using tooling device 1304 and tool 1344 in FIG. 13.

The process begins by positioning a number of layers of composite material with respect to a tool (operation 1500). Next, the process positions a tooling device comprising a tooling plate and a tab with a group of alignment features on the number of layers of composite material (operation 1502). The tab with the group of alignment features is co-bonded with the tooling plate.

Thereafter, the process receives a pin extending from the surface of the tool in one of the group of alignment features to position the tooling device on the number of layers of composite material (operation 1504). The process then cures the number of layers of composite material to form the composite part (operation 1506) with the process terminating thereafter. In this illustrative example, the tooling device is used to form a surface of the composite part during curing of the number of layers of composite material.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in the form of a block diagram in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in the form of a block diagram in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In particular, composite part 300 formed from tooling device 200 and tool 102 shown in FIG. 3 may be used during any one of the stages of aircraft manufacturing and service method 1600. Moreover, tooling device 200, the components within tooling device 200, composite part 300 or a combination thereof may be formed during component and subassembly manufacturing 1606. In other illustrative examples, composite part 300 may be installed or reworked during at least one of system integration 1608, routine maintenance and service 1614, or some other stage of aircraft manufacturing and service method 1600.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or a combination thereof. The use of a number of the different illustrative embodiments may substantially expedite the assembly, reduce the cost of aircraft 1700, or both.

Thus, the illustrative embodiments provide a method and apparatus for forming tooling device 200. In an illustrative embodiment, tooling device 200 comprises tooling plate 202, tab 206 associated with tooling plate 202, and group of alignment features 210 associated with tab 206. Tooling device 200 also includes tab 208 associated with tooling plate 202. Group of alignment features 212 is associated with tab 208. Tooling plate 202 is configured for use with tool 102 to form composite part 300. Group of alignment features 210 and group of alignment features 212 are configured to position tooling plate 202 with respect to tool 102 used to form composite part 300. Group of alignment features 210 and group of alignment features 212 are also configured to position tab 206 and tab 208, respectively, on tool 800 used to form tooling device 200.

With the use of a pre-machined tab with a group of alignment features, a tooling device may be manufactured more efficiently and accurately than with some currently used systems. When the tab is co-bonded with a number of layers of composite material in the tooling plate, additional drilling operations, routing operations, and other types of operations performed on the tooling device may be reduced or eliminated. Additionally, pre-machined tabs may be produced quickly in a high-volume manufacturing environment or purchased from a manufacturer. As a result, time savings in manufacturing tooling devices for forming composite parts may be realized.

Manufacturing a tooling device from a pre-machined tab also reduces the risk of inconsistencies forming in the tooling device. By decreasing the number of operations performed on the tooling device after formation, crack, voids, delamination and other inconsistencies may be reduced. As a result, fewer tooling devices may need be reworked or discarded. Further, when tooling devices are manufactured with fewer inconsistencies, surfaces of composite parts formed from the tooling devices may be formed more desirably and require less rework than with some currently used processes.

The manufacture of alignment features in the pre-machined tabs also may be more precise than with currently used techniques for forming alignment features in a cured tooling device. For instance, more precise measurements may be made, and openings cut in the tab. Increasing the precisions of measurements for the alignment features also increase the likelihood that tooling devices formed with these tabs fit on pins extending from the surface of tools.

Pre-machined tabs are also versatile and can be used for various types of tooling devices and in various numbers without increasing the number of operations performed on the tooling device, the number of operations needed to form a composite part, or both. In addition, the alignment features in these pre-machined tabs may not wear as quickly as those formed with some currently used manufacturing processes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a tooling device and forming a composite part, the method comprising:
    laying up a first number of layers of composite material on a first tool;
    positioning a tab having a group of alignment features with respect to the first number of layers of composite material using an alignment feature of the group of alignment features, the first tool, and a spacer positioned with respect to the first tool, wherein the alignment feature comprises a first opening configured to receive a first pin associated with the first tool;
    laying up a second number of layers of composite material, wherein the tab has a first portion interposed between the first number of layers of composite material and the second number of layers of composite material;
    after positioning the tab, co-bonding the first number of layers of composite material, the second number of layers of composite material, and the tab to form the tooling device;
    positioning a third number of layers of composite material with respect to a second tool; and
    positioning the tooling device on the third number of layers of composite material to form the composite part, wherein a second alignment feature of the group of alignment features comprises a second opening configured to receive a second pin associated with the second tool.

2. The method of claim 1, wherein the tab has a second portion that extends from a first end of the second number of layers of composite material.

3. The method of claim 1, wherein the group of alignment features is selected from an opening, a groove, a slot, a notch, a protrusion, and combinations thereof.

4. The method of claim 1, wherein the group of alignment features comprises openings, and the method further comprises:
    receiving a group of pins associated with the first tool in at least one of the openings.

5. The method of claim 1 further comprising:
    forming the entire group of alignment features in the tab prior to co-bonding the tab, the first number of layers of composite material, and the second number of layers of composite material.

6. The method of claim 1 further comprising:
    positioning the spacer between the first tool and a lower surface of the tab to support the tab during co-bonding of the tab, the first number of layers of composite material, and the second number of layers of composite material.

7. The method of claim 1, wherein the spacer comprises a set of clearance holes, and the method further comprises:
    receiving a pin extending from a surface of the first tool in at least one of the set of clearance holes.

8. The method of claim 7, wherein the spacer has a first thickness that is substantially a same thickness as a second thickness of the first number of layers of composite material, and the method further comprises:
    positioning the tab to rest on a coplanar surface formed by the spacer and the first number of layers of composite material.

9. The method of claim 1 further comprising:
    placing a layer of resin tape on the group of alignment features to maintain a shape of the group of alignment features.

10. A method of forming a tooling plate with a tab and a composite part, the method comprising:
    forming the composite part comprising:
        positioning a first number of layers of composite material with respect to a first tool;
        positioning the tab, the tooling plate, and a group of alignment features over the first number of layers of composite material, wherein the tooling plate comprises a second number of layers of composite material, and the group of alignment features is associated with the tab; and
        positioning the tooling plate with respect to the first tool using a first alignment feature of the group of alignment features, wherein the first alignment feature comprises a first opening configured to receive a first pin associated with the first tool; and
    forming the tooling plate with the tab comprising:
        positioning the tab with respect to a second tool and an offsetting spacer using a second alignment feature of the group of alignment features, the second tool, and the offsetting spacer, wherein the tab has a first portion that is interposed between layers of the second number of layers of composite material and wherein the second alignment feature comprises a second opening configured to receive a second pin associated with the second tool; and
        after positioning the tab with respect to the second tool, co-bonding the second number of layers of composite material and the tab.

11. The method of claim 10, wherein the tab has a second portion that extends from a first end of the tooling plate.

12. The method of claim 10 further comprising:
forming the entire group of alignment features in the tab prior to co-bonding the tab and the second number of layers of composite material.

13. The method of claim 10 further comprising:
positioning the offsetting spacer between the second tool and a lower surface of the tab to support the tab during co-bonding of the tab and the second number of layers of composite material.

14. The method of claim 10, wherein the offsetting spacer comprises a set of clearance holes, and the method further comprises:
receiving a pin extending from a surface of the second tool in at least one of the set of clearance holes.

15. The method of claim 10 further comprising:
placing a layer of resin tape on the group of alignment features to maintain a shape of the group of alignment features.

16. A method of forming a tooling device and a composite part, the method comprising:
forming the composite part comprising:
positioning a first number of layers of composite material with respect to a first tool;
positioning the tooling device over the first number of layers of composite material, the tooling device comprising a tooling plate, a tab, and a group of alignment features, wherein:
the tooling plate comprises a second number of layers of composite material; and
the group of alignment features comprises:
a first alignment feature configured to position the tooling plate with respect to the first tool; and
a second alignment feature configured to position the tab with respect to a second tool and a spacer, the spacer configured to support the tab during a co-bonding process of the tab with the tooling plate;
wherein the tab:
has a first portion that is between layers of the second number of layers of composite material; and
has a second portion that extends from a first end of the tooling plate;
forming the tooling device comprising:
positioning the tab using the second alignment feature, the second tool, and the spacer; and
after being positioned, co-bonding the tab with the second number of layers of composite material to form the tooling device.

17. The method of claim 16, wherein the first alignment feature comprises an opening configured to receive a pin associated with the first tool.

18. The method of claim 16, wherein the second alignment feature comprises an opening configured to receive a pin associated with the second tool.

19. The method of claim 16 further comprising:
forming the entire group of alignment features in the tab prior to co-bonding the tab and the second number of layers of composite material.

20. The method of claim 16 further comprising:
placing a layer of resin tape on the group of alignment features to maintain a shape of the group of alignment features.

* * * * *